(12) United States Patent
Weidinger

(10) Patent No.: US 9,679,173 B2
(45) Date of Patent: Jun. 13, 2017

(54) APPARATUSES AND METHODS USING COMMAND SETS SPECIFIC FOR CONTROLLING THE OPERATION OF A TYPE OF THE RFID TRANSPONDER TO WHICH THE COMMAND SETS ARE TRANSMITTED

(71) Applicant: NXP B.V., Eindhoven (NL)

(72) Inventor: Christian Weidinger, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/610,474

(22) Filed: Jan. 30, 2015

(65) Prior Publication Data

US 2015/0145652 A1 May 28, 2015

Related U.S. Application Data

(62) Division of application No. 12/643,721, filed on Dec. 21, 2009, now abandoned.

(51) Int. Cl.
*G06K 7/10* (2006.01)
*G06K 7/00* (2006.01)
*G06K 19/07* (2006.01)

(52) U.S. Cl.
CPC ....... *G06K 7/10366* (2013.01); *G06K 7/0008* (2013.01); *G06K 19/0723* (2013.01)

(58) Field of Classification Search
CPC .......................... G06K 19/0723; G06K 7/0008
USPC ............................................... 340/10.51, 5.8
See application file for complete search history.

(56) References Cited

U.S. PATENT DOCUMENTS

| | | | |
|---|---|---|---|
| 5,995,019 A | 11/1999 | Chieu et al. | |
| 6,172,596 B1 | 1/2001 | Cesar et al. | |
| 6,677,852 B1 | 1/2004 | Landt | |
| 7,075,412 B1 | 7/2006 | Reynolds et al. | |
| 7,417,599 B2 | 8/2008 | Goff et al. | |
| 7,633,392 B2 | 12/2009 | Neuwirth | |
| 8,134,451 B1 * | 3/2012 | Diorio | G06K 7/10297 235/375 |
| 2006/0181395 A1 | 8/2006 | Gruszynski | |
| 2006/0238305 A1 | 10/2006 | Loving et al. | |
| 2007/0194889 A1 * | 8/2007 | Bailey | H04L 9/321 340/10.51 |
| 2008/0068136 A1 | 3/2008 | Malik et al. | |
| 2008/0104010 A1 | 5/2008 | Subramanian et al. | |
| 2010/0060432 A1 * | 3/2010 | van Niekerk | G06K 7/0008 340/10.3 |

FOREIGN PATENT DOCUMENTS

WO 2006116238 A2 11/2006

* cited by examiner

*Primary Examiner* — Edwin Holloway, III

(57) ABSTRACT

Certain exemplary aspects of the present disclosure are directed toward an apparatus in which a first circuit communicates with a plurality of different types of RFID transponders using radio frequency signals. A second circuit detects and communicates with the plurality of different types of RFID transponders via the first circuit, respectively using a command set for the type of RFID transponder that the first circuit is communicating with. The second circuit, in response to detecting an RFID transponder having configuration data for a new command set, accesses and uses the configuration data for the new command set to update a configuration of the second circuit to enable communication with the new type of RFID transponder.

20 Claims, 2 Drawing Sheets

Figure 1:
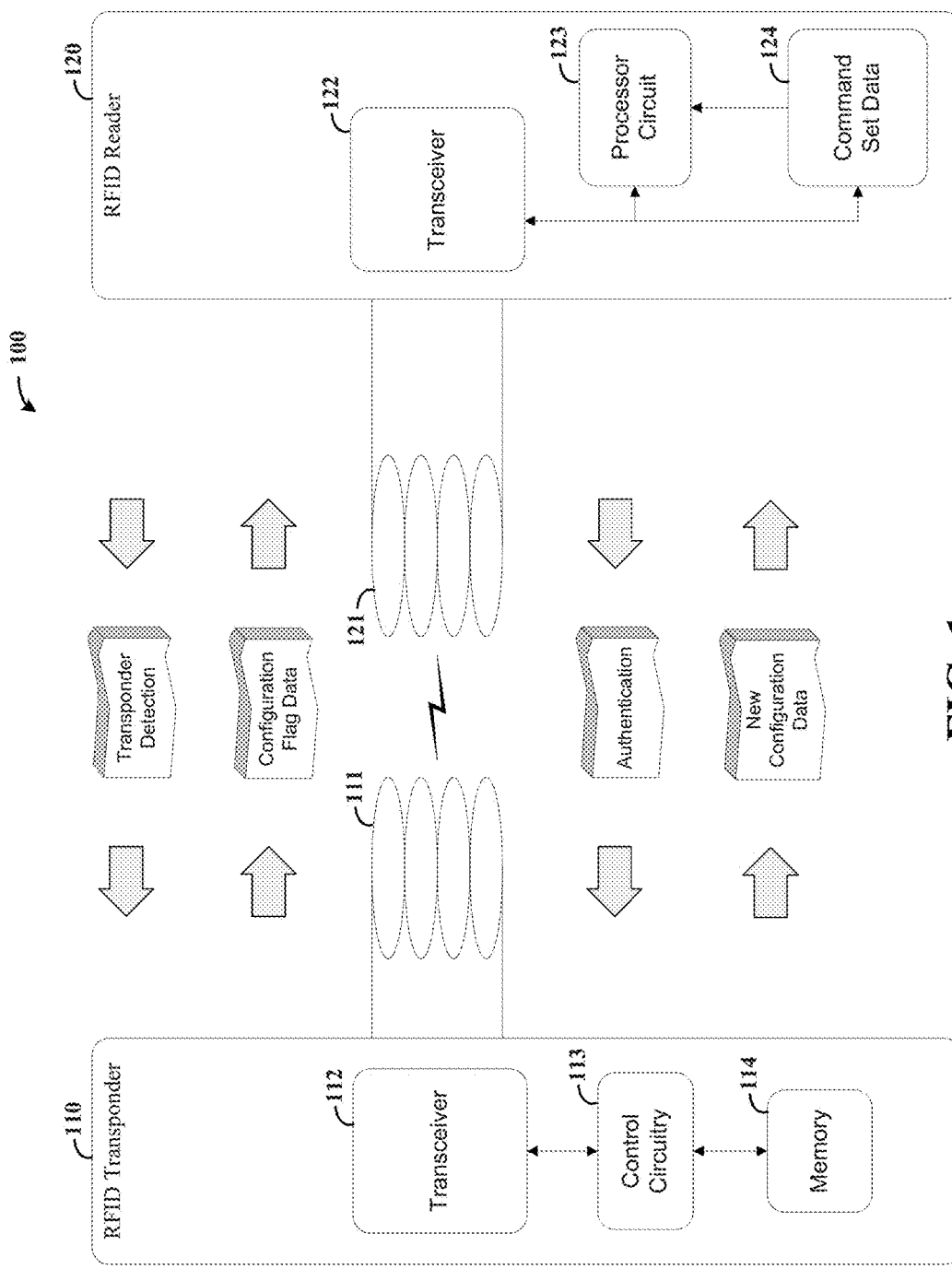

APPARATUSES AND METHODS USING COMMAND SETS SPECIFIC FOR CONTROLLING THE OPERATION OF A TYPE OF THE RFID TRANSPONDER TO WHICH THE COMMAND SETS ARE TRANSMITTED

The present disclosure relates generally to wireless communications, and more specifically to radio-frequency identification (RFID) communications using command sets specific for controlling the operation of a type of the RFID transponder to which the commands are transmitted.

RFID communications are effected between a reader and a transponder, with the transponder providing identification (or other) data in response to communications from the reader. For instance, the transponder can be part of a tag (RFID tag) or other object affixed to a subject or object to be identified.

In RFID systems often that include at least one RFID reader and at least one RFID transponder, the RFID reader can generate an electromagnetic field that is used for transmitting data between the RFID reader and the RFID transponder. Different types of RFID transponders implement different sets of commands and features for communicating with an RFID reader.

Updating RFID readers has been generally difficult and/or burdensome. For example, a customer may need to access appropriate software or firmware from an RFID reader/transponder supplier, and then install the software or firmware on each one of the customer's RFID readers. Such a process can take a significant amount of time before all the RFID readers are updated to support a new type of RFID transponder. Moreover, many RFID readers, such as portable readers, are not networked or are otherwise incapable of reading software or firmware. This makes updating the readers even more challenging.

These and other issues continue to present challenges to the utilization of RFID tags and other related circuits.

The present disclosure is exemplified in a number of implementations and applications, some of which are summarized below.

According to an exemplary embodiment of the present disclosure, a first circuit communicates radio frequency signals with a plurality of different types of RFID transponders. A second circuit that communicates with the plurality of different types of RFID transponders via the transceiver, detects the type of each of the RFID transponders based on communications with each of the RFID transponders. The second circuit then controls the operation of each RFID transponder by transmitting commands to the RFID transponders using command sets specific for controlling the operation of the type of the RFID transponder to which the commands are transmitted. In response to detecting a type of RFID transponder having configuration data for a new command set, the second circuit accesses the configuration data from the transponder, and uses the configuration data for the new command set to update a command set enabling control of a new type of RFID transponder. Thereby, in response to detecting an RFID transponder of the new type, the second circuit may control the operation of the RFID transponder of the new type using the new command set.

Consistent with the above characterization, in another more specific example embodiment, the processor circuit is configured to detect an RFID transponder having configuration data for a new and altered command set, and to access and use the new and altered command set to control the RFID reader circuit.

The above summary is not intended to describe each embodiment or every implementation of the present disclosure. The figures and detailed description that follow more particularly exemplify various embodiments.

Figure 2:
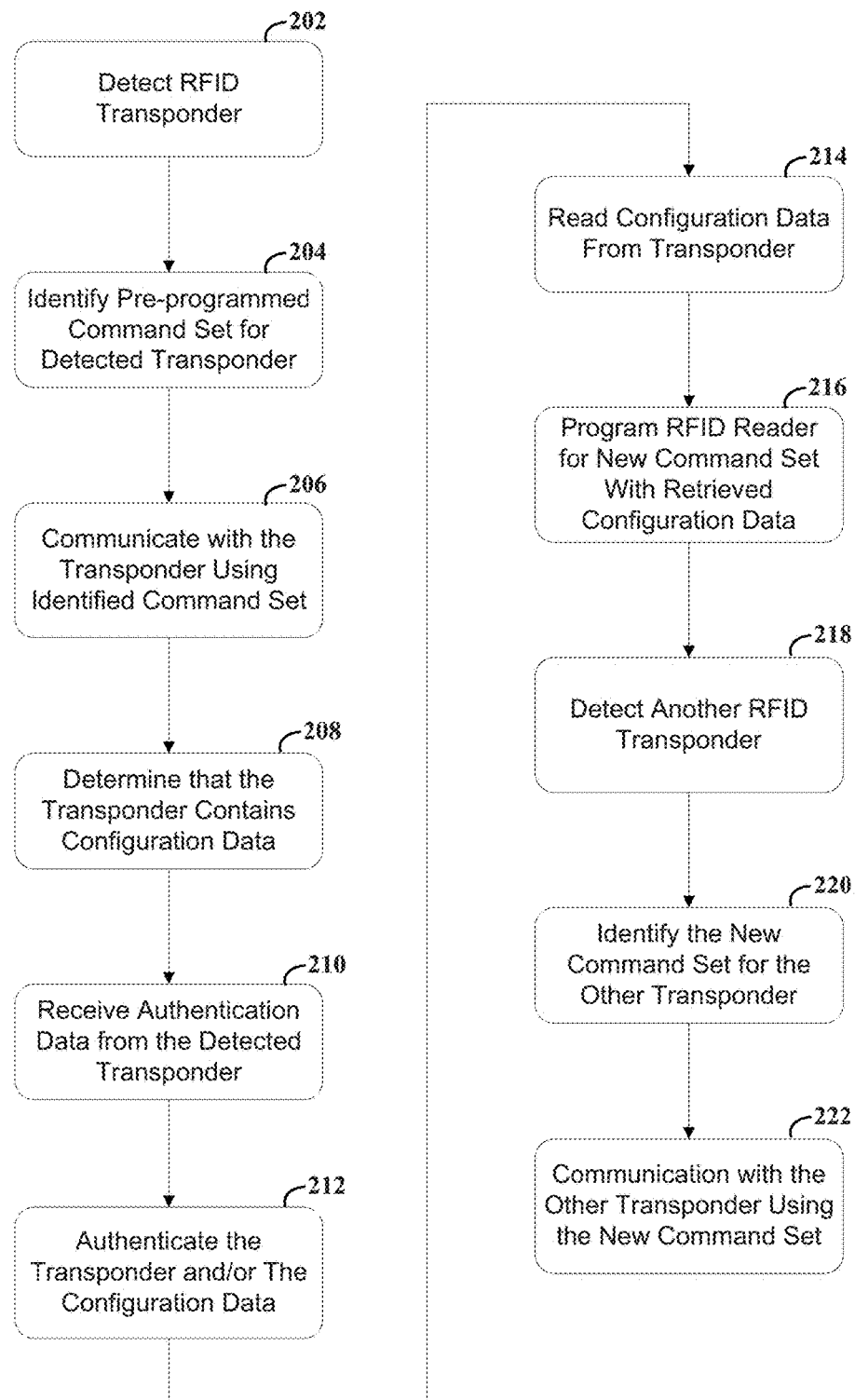

The disclosure may be more completely understood in consideration of the following detailed description of various embodiments of the disclosure in connection with the accompanying drawings, in which:

FIG. 1 shows an RFID circuit arrangement, in accordance with an example embodiment of the present disclosure; and FIG. 2 is a flow diagram for RFID communications and configuration, according to another example embodiment of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents and alternatives falling within the scope of the disclosure including aspects defined in the claims.

The present disclosure is believed to be applicable to a variety of different types of processes, devices and arrangements for use with RFID applications. While the present disclosure is not necessarily so limited, various aspects of the disclosure may be appreciated through a discussion of examples using this context.

According to an example embodiment of the present disclosure, a radio-frequency identification (RFID) reader is configured to wirelessly communicate with a plurality of different types of RFID transponders. In response to detecting a configuration transponder, the RFID reader reads configuration data from the configuration transponder and reconfigures itself to operate with a new command set, which may be an existing command set with one or more aspects thereof updated and/or added (e.g., a new command, security feature or communications protocol), or may include an entirely new command set. In response to detecting an RFID transponder using the new command and/or command set, the RFID reader uses the reconfigured command/command set to communicate with the RFID reader.

In connection with another example embodiment, an RFID system includes a reader and a transponder, where the RFID reader is configured with information identifying a command set and data structure of the transponder to enable the reader to access the transponder. Transponders of the same type behave in the same manner with respect to command set and data structure. Accordingly, the RFID reader stores command sets that identify the features supported by each of the different types of RFID transponders and uses the stored command sets to make proper use of the feature sets supported by a particular type of RFID transponder. In one implementation, the command sets supported by the RFID reader are stored in a lookup table that lists the features supported by each specific type of RFID transponder, and the RFID reader retrieves an appropriate command set from the lookup table when encountering an RFID transponder.

The RFID reader is further configured to detect configuration RFID transponders that include new configuration data for reconfiguring the RFID reader, and reads the new configuration data to update the RFID reader (e.g., by updating firmware, software and/or storing configuration data in a lookup table). This new configuration data may, for example, include an entirely new command set for communicating with a new type of RFID transponder, or a new command for a derivative type of RFID transponder that uses a new command as part of an existing command set. When the RFID reader subsequently detects a new type or derivative type of an RFID transponder that uses the new configuration data (e.g., a new command or command set), the RFID reader uses the new configuration data to communicate with the new/derivative RFID transponder.

The configuration RFID transponder is of a type that is already supported by the RFID reader, or at least operates using a sufficient subset of features required for the RFID reader to access the configuration data that are supported by the RFID reader. In some instances, the RFID reader is configured with a separate command set for communicating with a configuration RFID transponder. This command set may, for example, be updated and/or completely replaced with new configuration RFID transponder command sets as appropriate, using a configuration RFID transponder with new configuration data as discussed above.

In another embodiment, a configuration RFID transponder is configured to access a firmware update mechanism of an RFID reader. The configuration RFID transponder contains configuration data for enabling the RFID reader to communicate with a new type of RFID transponder. The configuration RFID transponder provides a command to the RFID reader to run a firmware update in the reader. The configuration RFID transponder then provides configuration data to the RFID reader. The RFID reader uses the configuration data to establish a new command set for communicating with the new type of RFID transponder. In one implementation, the configuration RFID transponder contains authentication data such as a password which is provided to the RFID reader to access the firmware update mechanism.

According to another example embodiment of the present disclosure, an RFID reader is configured to support all possible commands and features of an RFID transponder/tag platform IC (integrated circuit). In one implementation, the commands and features supported by specific types of RFID tags are stored in the RFID reader in the form of a lookup table. The tag platform IC is the IC hardware comprising the sum of the functionality of all members (tag derivatives) of the product family. The tag derivatives support subsets of the platform IC functionality (e.g., different commands and features). The RFID reader is configured to support all of the different commands and features of the platform IC. The RFID reader also stores information regarding which commands and features of the platform IC are implemented by the different types of RFID tags. The RFID reader uses this stored information to communicate with the different types of RFID tags. When a new RFID tag derivative is introduced, RFID reader is updated to include information specifying the commands and features of the platform IC that are implemented by the new RFID tag derivative. The RFID reader then uses such information when communicating with tag derivatives of the new type.

New types of RFID tag derivatives can include commercial derivatives and physical derivatives. Commercial derivatives have different configurations (e.g., they implement a different set of commands and features of the platform IC) than existing tags in the production test without changing the production mask set. Physical derivatives involve changes to the production mask set. Commercial derivatives are flexible and tend to have a shorter time to market, whereas physical derivatives allow for smaller die sizes. For each new derivative of RFID tag that is brought to the market, a further entry needs to be added to the lookup table of the RFID reader to enable the reader to communicate with the new type of RFID tag. Configuration data for the new entry in the lookup table is stored in a configuration RFID tag of a type that is already supported by the RFID reader. The firmware of the RFID reader is updated by accessing the configuration data and storing the new entry in the lookup table for the new RFID tag derivative.

Other embodiments are directed to using RFID tags for initial configuration of RFID readers. For instance, before a particular reader is used to read RFID tags (e.g., after initial delivery to a customer), a configuration RFID tag is used to define the type of RFID tags that the reader can access. Such a reader may be programmed to read RFID configuration tags at the factory, and tailored in the field to read a predefined set of RFID tags. This approach permits the use of a common manufacturing process across readers to be used in completely different implementations and with completely different platforms, and subsequent in-field programming of the readers to tailor them to their specific applications.

Table 1 contains an example command and feature set of an RFID tag platform IC, in accordance with one or more example embodiments. RFID tags can implement one or more RFID standards including, but not limited to, the ISO15693 standard provided by the International Organization for Standardization (Geneva, Switzerland), and EPC AutoID and EPC G2 standards available from the EPCglobal standards group. The command set of an RFID standard includes mandatory, optional and custom commands. Mandatory commands are commands that shall be supported, optional commands are commands that may be supported and custom commands are additional commands that may be defined by the IC vendor. RFID tags can also implement a variety of features including, but not limited to, data coding, data transmission rates, memory size and structure, security features and sensors.

TABLE 1

| Configuration Option | Supported | Example |
| --- | --- | --- |
| feature 1 | yes | EAS (Electronic Article Surveillance) |
| feature 2 | yes | User memory password protection |
| optional command 1 | yes | |
| optional command 2 | yes | |
| custom command 1 | yes | high speed anti-collision |
| custom command 2 | yes | |
| user memory available | 8 kbit | |
| RFID standard 1 | yes | ISO15693 |
| RFID standard 2 | yes | EPC AutoID |
| custom command extension 1 | yes | selective EAS |

Tables 2-4 show example command and feature sets of different types of RFID tags, as used in accordance with various example embodiments. RFID tags each have a number that uniquely identifies each RFID tag, for example, in the ISO15693 standard the number is referred to as a UID (Unique identifier). No two RFID tags have the same UID. The UID number is programmed during production of the RFID tag by the IC manufacturer. Table 2 shows the commands and features supported by a first low end, low cost, UID only tag derivative. Table 3 shows the commands and features supported by a second high end tag derivative having dual standard support. Table 4 shows the commands and features supported by a third high end memory tag derivative.

TABLE 2

| Configuration Option | Supported | Example |
| --- | --- | --- |
| feature 1 | no | EAS (Electronic Article Surveillance) |
| feature 2 | no | User memory password protection |
| optional command 1 | no | |
| optional command 2 | no | |
| custom command 1 | no | high speed anti-collision |
| custom command 2 | no | |
| user memory available | 0 kbit | max: 8 kbit |
| RFID standard 1 | yes | ISO15693 |
| RFID standard 2 | no | EPC AutoID |
| custom command extension 1 | no | selective EAS |

TABLE 3

| Configuration Option | Supported | Example |
| --- | --- | --- |
| feature 1 | yes | EAS (Electronic Article Surveillance) |
| feature 2 | no | User memory password protection |
| optional command 1 | yes | |
| optional command 2 | yes | |
| custom command 1 | yes | high speed anti-collision |
| custom command 2 | yes | |
| user memory available | 2 kbit | max: 8 kbit |
| RFID standard 1 | yes | ISO15693 |
| RFID standard 2 | yes | EPC AutoID |
| custom command extension 1 | yes | selective EAS |

TABLE 4

| Configuration Option | Supported | Example |
| --- | --- | --- |
| feature 1 | no | EAS (Electronic Article Surveillance) |
| feature 2 | yes | User memory password protection |
| optional command 1 | no | |
| optional command 2 | no | |
| custom command 1 | no | high speed anti-collision |
| custom command 2 | no | |
| user memory available | 8 kbit | max: 8 kbit |
| RFID standard 1 | yes | ISO15693 |
| RFID standard 2 | no | EPC AutoID |
| custom command extension 1 | no | selective EAS |

FIG. 1 shows an RFID circuit arrangement 100, in accordance with another example embodiment of the present disclosure. The circuit arrangement 100 includes an RFID transponder 110 and an RFID reader 120. The RFID transponder 110 and the RFID reader 120 wirelessly communicate with each other via RF interfaces 111 and 121. The RFID reader 120 includes a transceiver 122 for communicating with the RFID transponder 110, a processor circuit 123 and memory circuit 124 that stores command set data specifying the commands and features supported by different types of RFID transponder. As such, the RFID reader 120 is configured with feature sets of a plurality of different types of RFID transponders or transponder derivatives. In one implementation, the command set data is stored in a lookup table that lists the features supported by specific types of RFID transponders.

The RFID transponder 110 includes a transceiver 112 for communicating with the RFID reader 120, control circuitry 113 and a memory 114 that stores configuration data for updating the command set data of the RFID reader 120. The memory 114 includes both system memory and user memory as discussed in relation to Table 5. In one implementation, the control circuitry 113 is a finite state machine.

The RFID reader 120 generates an electromagnetic field that is used for communications between RFID reader 120 and the RFID transponder 110. In one implementation, the electromagnetic field is also used to supply power to the RFID transponder 110. In another implementation, the RFID transponder 110 includes a power source such as a battery. Further details regarding methods of communications between RFID readers and transponders and regarding power supplied to RFID transponders is found in U.S. Pat. Nos. 7,633,392, 7,417,599 and 5,995,019, each of which is hereby fully incorporated by reference in its entirety.

The RFID reader 120 is configured to use an appropriate command set for communicating with the RFID transponder 110, based upon the type of the RFID transponder, to make proper use of the features supported by the RFID transponder. Accordingly, when the RFID reader 120 detects the RFID transponder 110, the RFID reader 120 determines the type of the RFID transponder 110 and accesses appropriate command set data for the identified type of RFID transponder. Using the accessed command set, the RFID reader 120 communicates with the RFID transponder 110. For example, if memory in the RFID transponder 110 is password protected, the RFID reader 120 needs to be aware of the password protection and uses the appropriate commands to access data in the memory. In one implementation, the RFID reader 120 automatically uses optional features and commands that are supported by a specific type of RFID transponder, such as a faster anti-collision command, when communicating with that type of RFID transponder.

In one implementation, the RFID reader 120 is reconfigured to communicate with a new RFID transponder derivative, using the RFID transponder 110 as a configuration transponder to update and reconfigure the RFID reader 120 to be capable of communicating with a new transponder derivative. For example, the RFID transponder 110 may include a new command for use with an existing command set or communication protocol. The RFID transponder 110 can thus be used to add an additional feature or command to those used by the RFID reader 120 to be implemented by an existing type of RFID tag.

In another implementation, the RFID reader 120 is reconfigured to communicate with a new RFID transponder using an entirely new command set, using the RFID transponder 110 as a configuration transponder to reconfigure the RFID reader with a new command set. Such a command set may include, for example, a tag type identifier, a communications standard/protocol, a feature set, data coding, data rates, memory size and structure, security features, sensors and one or more of mandatory, optional and custom commands.

In some implementations, the RFID transponder 110 sends configuration flag data to the RFID reader 120 indicating that the transponder contains configuration data for updating the reader. This configuration flag data may, for example, be stored in a lookup table and used by the RFID reader 120 to identify the RFID transponder 110 as a configuration transponder. A configuration transponder such as transponder 110 can be used for each new RFID transponder for which the RFID reader 120 is to read, such as when a new type of RFID transponder is brought to market. A further entry can thus be added into the lookup table of the reader 120 (e.g., for firmware) to facilitate communications with new transponder types.

The RFID transponder 110 is implemented in one or more of a variety of manners. In some instances, the RFID transponder 110 is of a configuration type that the RFID reader 120 is programmed to communicate with. In other instances, the RFID transponder 110 is of a type that is already supported by the RFID reader 120 (e.g., with appropriate communication data for the transponder stored in a lookup table), thereby enabling the transponder to communicate with the reader.

In some implementations, the RFID reader 120 authenticates the transponder 110 and/or the configuration data stored on the transponder 110 to ensure that the transponder is authorized to update the RFID reader 120. For example, the configuration data can contain data needed to access the firmware update mechanism of the RFID reader 120. In one implementation, the authentication/access data includes a password or other predefined authentication data needed by the RFID reader 120 to verify the authenticity of the configuration RFID transponder 110. The configuration data stored on the RFID transponder 110 can also be encrypted for additional security. In another implementation, the reader 120 is configured to use a cyclic redundancy check to prevent errors in the transmission of the configuration data from the RFID transponder 110 to the RFID reader 120.

Table 5 shows an example of the data stored in the memory of a configuration transponder such as transponder 110 of FIG. 1.

TABLE 5

| System Memory | UID (Unique Identifier) |
| | DSFID (Data Storage Format Identifier, see ISO15693) |
| | AFI (Application Family Identifier, see ISO15693) |
| User memory | tag type identifier |
| | tag type feature list (see Table 6) |
| | authentication/access data |
| | cyclic redundancy check (CRC) |
| | other user data |

Table 6 shows an example transponder type feature list that would be stored in the configuration transponder and used to update an RFID reader. The transponder type feature list contains the supported information of the new transponder derivative in compact format (17 bits in the example shown in Table 6).

At step 208, the RFID reader determines that the detected RFID transponder contains configuration data for updating the RFID reader. In one implementation, the RFID transponder sends authentication data such as a password to the RFID reader to access the update mechanism of the reader at optional step 210. The RFID reader then authenticates the RFID transponder and/or the configuration data stored in the RFID transponder at step 212.

After authentication or otherwise detecting that the RFID transponder contains configuration data, the RFID reader reads the configuration data from the transponder at step 214. The configuration data is used to establish a new command set in the RFID reader that identifies the commands and features that are supported by a new type of RFID transponder at step 216. In one implementation, the commands and features supported by the new type of RFID transponder are programmed as a new entry in a lookup table of the RFID reader.

The RFID reader detects another RFID transponder at step 218. The RFID reader then identifies the other RFID transponder as being of the new type that uses the new command set at step 220. The RFID reader then uses the commands and features of the new command set for communicating with other RFID transponder at step 222.

Based upon the above discussion and illustrations, those skilled in the art will readily recognize that various modifications and changes may be made to the present disclosure without strictly following the exemplary embodiments and applications illustrated and described herein. For example, the configuration RFID tag can be used in a system that includes multiple RFID readers to update each of the readers to communicate with new types of RFID tags. Circuits such as those referred to as processors, control circuits or processor circuits can be implemented using hardware, a finite state machine or other circuitry. In addition, terms referring to commands or command sets may involve a variety of

TABLE 6

| feature 1 | feature 2 | optional command 1 | optional command 2 | custom command 1 | custom command 2 | [7] user memory available | [6] | [5] | [4] | [3] | [2] | [1] | [0] | RFID Standard 1 | RFID Standard 2 | custom command extension 1 |
|---|---|---|---|---|---|---|---|---|---|---|---|---|---|---|---|---|
| 1 | 0 | 1 | 1 | 1 | 1 | 0 | 0 | 0 | 0 | 0 | 0 | 1 | 0 | 1 | 1 | 1 |

FIG. 2 is a flow diagram for RFID communications and configuration, according to another example embodiment of the present disclosure. The communications and configuration are implemented by an RFID reader and an RFID transponder such as RFID reader 120 and RFID transponder 110 of FIG. 1. The RFID reader detects an RFID transponder at step 202. The RFID reader then identifies the pre-programmed command set used by the detected RFID transponder at step 204. The pre-programmed command set for the detected RFID transponder identifies the commands and features supported by the detected RFID transponder. Different types of RFID transponders support different combinations of commands and features. The RFID reader then uses the commands and features of the identified command set for communicating with detected RFID transponder at step 206.

different types of data in addition to and/or as an alternative to those described. Such modifications do not depart from the true spirit and scope of the present disclosure, including that set forth in the following claims.

What is claimed is:
1. An apparatus comprising:
a first circuit configured to communicate radio frequency signals with a plurality of different types of radio frequency identification (RFID) transponders having an integrated circuit that carries out commands; and
a second circuit configured and arranged to:
communicate with the plurality of different types of RFID transponders via the first circuit,
detect the type of each of the plurality of different types of RFID transponders based on communications with each RFID transponder via the first circuit, control the operation of each of the plurality of different types of RFID transponders by transmitting commands to the RFID transponders, using command sets specific for controlling the operation of the type of the RFID transponder to which the commands are transmitted, store the command sets and configuration flag data in a lookup table that lists features supported by each of the different types of RFID transponders, in response to receipt of configuration flag data from an RFID transponder, identify the RFID transponder as a configuration RFID transponder having configuration data for at least one new command that is different than commands in said command sets, access the configuration data from the configuration RFID transponder, and use the configuration data for the new command to generate a modified command set by modifying an existing command set to include the at least one new command while maintaining existing commands within the command set, to enable control of a new type of RFID transponder using a communication protocol, and in response to detecting an RFID transponder of the new type, control the operation of the integrated circuit in the RFID transponder of the new type using the modified command set, by sending a command from the modified command set to the RFID transponder and using the command to control the RFID transponder to operate the integrated circuit in accordance with the modified command set.

2. The apparatus of claim 1, wherein the communication protocol is defined in the existing command set, wherein generating the modified command set includes maintaining the communication protocol, and wherein the second circuit is configured and arranged to access the configuration data from the configuration RFID transponder by communicating with the configuration RFID transponder via the first circuit and therein controlling the configuration RFID transponder to transmit the configuration data to the first circuit, the configuration data for the at least one new command including data that identifies different features supported by the new type of RFID transponder that are in addition to features controlled via previously stored command sets, and control the operation of the RFID transponder of the new type by using the data that identifies the features supported by the new type of RFID transponder and controlling the RFID transponder to carry out the identified features by communicating with the new type of RFID transponder using the communication protocol to transmit the at least one new command in the modified command set data to the RFID transponder, therein controlling the integrated circuit of the RFID transponder with the at least one new command.

3. The apparatus of claim 1, wherein the second circuit is configured and arranged to for each RFID transponder from which communications are received, control the operation of the transponder by retrieving one of the command sets based on the detected type of the RFID transponder, using the retrieved one of the command sets to control the operation of the RFID transponder.

4. The apparatus of claim 1, wherein the second circuit is configured and arranged to modify the existing command set having mandatory, optional and custom commands by replacing at least one of the optional and custom commands in the existing stored command set with new commands, and control the operation of the RFID transponder of the new type using the new commands.

5. The apparatus of claim 4, wherein the second circuit is configured and arranged to control the operation of the RFID transponder of the new type using both the existing commands and the at least one new command.

6. The apparatus of claim 1, wherein the second circuit is configured and arranged to update a further command set by replacing the further command set with a new command set provided by the configuration RFID transponder.

7. The apparatus of claim 1, wherein the second circuit is configured and arranged to generate the modified command set by modifying the existing command set to operate with a communications protocol that is the same as a communication protocol used by the existing command set, prior to being modified.

8. The apparatus of claim 1, wherein the second circuit is configured and arranged to modify the existing command set and maintain another command set for a different type of RFID transponder unchanged, and after modifying the existing command set in response to detecting an RFID transponder of the different type, control the operation of the RFID transponder of the different type using the maintained other command set.

9. The apparatus of claim 1, wherein the second circuit is configured and arranged to modify the existing command set by modifying a portion of the existing command set including at least one of: a tag type identifier, data rate instructions, memory size and structure instructions, security feature instructions, sensor operation instructions, and any combination thereof.

10. The apparatus of claim 1, wherein the second circuit is factory-configured with a single command set for reading the configuration RFID transponder, and configured and arranged to, prior to communicating with RFID transponders that do not include configuration data, access at least one configuration RFID transponder to field-configure the second circuit with a command set for each of the plurality of different types of RFID transponders.

11. The apparatus of claim 1, wherein the second circuit is further configured to in response to detecting the configuration RFID transponder, authenticate at least one of the configuration data and the RFID transponder, and in response to the authentication, access and use the configuration data for the at least one new command to update the configuration of the second circuit.

12. The apparatus of claim 11, wherein the second circuit is further configured to authenticate at least one of the configuration data and the detected RFID transponder, responsive to password data provided to the second circuit by the detected RFID transponder.

13. The apparatus of claim 1, wherein the second circuit is configured and arranged to use the configuration data for the at least one new command to update firmware stored at the second circuit, and to use the updated firmware to control operation of the second circuit.

14. An apparatus comprising:

a first radio frequency identification (RFID) transponder circuit configured and arranged with a data storage circuit storing configuration data including new commands for a new command set and configuration flag data, and being configured and arranged to:

communicate with RFID reader circuits, authenticate the communication with the RFID reader circuits, and access and transmit the configuration data for the new command set to the RFID reader circuits based on the authentication, the new commands being operable to control operation of a new type of RFID transponder circuit; and an RFID reader circuit configured and arranged to:

store command sets and configuration flag data in a lookup table that lists the features supported by each of the different types of RFID transponders, communicate with a plurality of different types of RFID transponders including the first RFID transponder circuit, detect the type of each of the plurality of different types of RFID transponders based on communications with each RFID transponder, control the operation of each of the plurality of different types of RFID transponders by transmitting commands to the RFID transponders using command sets specific for controlling the operation of the type of the RFID transponder to which the commands are transmitted, in response to receipt of the configuration flag data from the first RFID transponder circuit, identify the first RFID transponder circuit as a configuration RFID transponder having configuration data for the new commands, control the first RFID transponder circuit to access and transmit the new commands to the RFID reader and modify an existing command set to include the new commands and existing commands within the existing command set to enable control of a new type of RFID transponder, and in response to detecting an RFID transponder of the new type, control the operation of integrated circuitry within the RFID transponder of the new type using the modified command set.

15. The apparatus of claim 14, wherein the configuration data includes data that identifies features supported by the new type of RFID transponder, including a sensor in the RFID transponder, and includes data to access firmware update mechanisms of the RFID reader circuits, and the RFID reader circuit is configured and arranged to control the operation of the sensor in the RFID transponder of the new type by sending the new commands to the RFID transponder to control the operation of the sensor with the new commands.

16. The apparatus of claim 14, wherein the existing command set includes mandatory, optional and custom commands, and wherein the RFID reader circuit is configured and arranged to modify the existing command set by replacing at least one of the optional and custom commands with the new commands, and control the operation of the RFID transponder of the new type using the at least one of the optional and custom new commands.

17. The apparatus of claim 16, wherein the RFID reader circuit is configured and arranged to control the operation of the RFID transponder of the new type using both the existing commands and the new commands.

18. The apparatus of claim 16, wherein the RFID reader circuit is configured and arranged to for each RFID transponder from which communications are received, control the operation of the transponder by retrieving one of the command sets based on the detected type of the RFID transponder, using the retrieved one of the command sets to control the operation of the RFID transponder.

19. The apparatus of claim 14, further including the new type of RFID transponder.

20. The apparatus of claim 1, wherein the second circuit is configured and arranged to control the operation of the RFID transponder of the new type using the new command set by communicating with the new type of RFID transponder using the communication protocol.

* * * * *